US011962139B2

United States Patent
Robinson et al.

(10) Patent No.: US 11,962,139 B2
(45) Date of Patent: Apr. 16, 2024

(54) APPARATUS FOR RETAINING ELECTRICAL CABLES

(71) Applicant: CMP PRODUCTS LIMITED, Newcastle upon Tyne (GB)

(72) Inventors: David Robinson, Cramlington (GB); Lee Frizzell, Cramlington (GB)

(73) Assignee: CMP PRODUCTS LIMITED, Newcastle Upon Tyne (GB)

( * ) Notice: Subject to any disclaimer, the term of this patent is extended or adjusted under 35 U.S.C. 154(b) by 0 days.

(21) Appl. No.: 17/985,547

(22) Filed: Nov. 11, 2022

(65) Prior Publication Data

US 2023/0060845 A1    Mar. 2, 2023

Related U.S. Application Data

(62) Division of application No. 17/046,822, filed as application No. PCT/EP2019/058965 on Apr. 9, 2019, now Pat. No. 11,532,929.

(30) Foreign Application Priority Data

Apr. 20, 2018  (EP) ..................... 18168584

(51) Int. Cl.
*H02G 3/32*    (2006.01)
*F16L 3/10*    (2006.01)
*F16L 3/22*    (2006.01)

(52) U.S. Cl.
CPC .............. *H02G 3/32* (2013.01); *F16L 3/1066* (2013.01); *F16L 3/1091* (2013.01); *F16L 3/22* (2013.01)

(58) Field of Classification Search
CPC ......... F16L 3/16; F16L 3/1066; F16L 3/1075; F16L 3/22; F16L 3/1091; H02G 3/32; F16B 7/0433
See application file for complete search history.

(56) References Cited

U.S. PATENT DOCUMENTS 2,305,048 A * 12/1942  Wert ........................ F16L 3/16
                                                      248/59
2,439,067 A *  4/1948  Wood .................. F01N 13/1822
                                                      248/58
4,128,219 A * 12/1978  Kaigler, Jr. ............. F16L 1/026
                                                      248/55

(Continued)

FOREIGN PATENT DOCUMENTS

CN         204554254 U      8/2015
CN         105762743 A      7/2016

(Continued)

OTHER PUBLICATIONS

Extended European Search Report for Application No. 21189841.6, dated Nov. 25, 2021.

(Continued)

*Primary Examiner* — Bradley Duckworth
(74) *Attorney, Agent, or Firm* — Billion & Armitage

(57) ABSTRACT

A cable retaining apparatus includes a body defining at least one aperture for receiving a respective cable, a first insulator device arranged in the, or each, aperture for preventing electrical conduction from a cable to a surface of the body facing the cable, and a second insulator device for preventing electrical conduction from a cable to a surface of the body facing away from the cable.

6 Claims, 14 Drawing Sheets

(56) References Cited

U.S. PATENT DOCUMENTS

| | | | |
|---|---|---|---|
| 4,140,292 A * | 2/1979 | Kaigler, Jr. | F16L 3/16 405/184.5 |
| 4,741,513 A | 5/1988 | Smith | |
| 5,271,586 A * | 12/1993 | Schmidt | F16B 37/046 248/68.1 |
| 5,742,982 A | 4/1998 | Dodd et al. | |
| 6,053,456 A | 4/2000 | Dispenza | |
| 6,339,231 B1 | 1/2002 | Ohta | |
| 6,536,982 B2 | 3/2003 | Gibbons et al. | |
| 7,952,027 B2 | 5/2011 | Grelck | |
| 8,958,681 B2 * | 2/2015 | Ripplinger | G02B 6/475 385/136 |
| 9,551,438 B2 | 1/2017 | Frizzell | |
| 9,601,241 B2 * | 3/2017 | Dannenberg | H02G 3/32 |
| 10,125,896 B2 * | 11/2018 | Gerardo | F16L 3/1075 |
| 10,378,679 B2 | 8/2019 | Booth et al. | |
| 10,433,926 B2 | 10/2019 | Recanati et al. | |
| 10,436,352 B2 | 10/2019 | Peterson et al. | |
| 11,165,230 B1 * | 11/2021 | Jordan | H02G 1/02 |
| 2009/0140108 A1 | 6/2009 | Faied | |
| 2018/0080579 A1 | 3/2018 | Costigan | |
| 2020/0059075 A1 * | 2/2020 | Rouleau | H02G 3/0456 |

FOREIGN PATENT DOCUMENTS

| | | |
|---|---|---|
| CN | 106848961 A | 6/2017 |
| CN | 207064158 U | 3/2018 |
| CN | 112204840 A | 1/2021 |
| EP | 2571124 A1 | 3/2013 |
| EP | 2839195 A1 | 2/2015 |
| FR | 3001175 A1 | 7/2014 |
| JP | H03 127435 U | 12/1991 |
| KR | 101582285 B1 | 1/2016 |
| KR | 101848847 B1 | 4/2018 |
| WO | 2011039540 A1 | 4/2011 |

OTHER PUBLICATIONS

International Search Report and Written Opinion, dated Sep. 23, 2019.

Third Office Action for Chinese Application No. 201980031031.4, dated Jul. 5, 2022.

* cited by examiner

APPARATUS FOR RETAINING ELECTRICAL CABLES

CROSS-REFERENCE TO RELATED APPLICATION

This application is a divisional application of U.S. application Ser. No. 17/046,822 filed on Oct. 12, 2020, which is a US National Stage of International Application No. PCT/EP2016/058965 filed Apr. 9, 2019, which claimed priority to European Patent Application 18168584.3 filed Apr. 20, 2018, the entire disclosure of each of which is hereby incorporated by reference.

TECHNICAL FIELD OF THE INVENTION

The present disclosure relates to an apparatus for retaining electrical cables and relates particularly, but not exclusively, to an apparatus for retaining high-voltage cables in a separated trefoil configuration. The present disclosure also relates to a mounting device for mounting the apparatus to a surface and to an insert suitable for use with the apparatus.

BACKGROUND

A cable cleat is a device for securing one or more electrical cables to a surface. The surface may be oriented at any angle. Some types of cable cleat secure a plurality of cables together. Cable cleats are installed at intervals along a length of the one or more cables to provide sufficient anchoring to the surface and to provide sufficient restraint when there is a plurality of cables being held together, for reasons described in detail below.

When a plurality of electrical cables is laid in proximity to one another, current passing through the cables creates electromechanical forces which act on the cables. Especially large electromechanical forces are generated in the event of an electrical connection being made between two or more of the cables, such as during a short circuit. These forces can cause the cables to violently repel each other, which can be dangerous to personnel located near the cables. Cable cleats are used to retain cables in position in the event of such an occurrence.

Cable cleats hold electrical cables tightly together. This increases the magnitude of the electromechanical forces experienced by the cables due to increased proximity and leads to a more violent reaction of the cables to a short circuit. Furthermore, the cables being held tightly together decreases the total surface area in contact with air surrounding the cables, which leads to reduced dissipation of the thermal energy generated in the cables through Joule heating during current transport. As the cables heat up, they become less effective at carrying current due to their increased resistance. This leads to an increase in costs associated with the distribution of electrical power via the cables.

As electrical cables heat up and cool down, they expand and contract. As lengths of laid cables are fixed in position in a number of locations along the cables, the cables therefore buckle as they expand. This results in the cables cleats restraining the cables to experience strain forces, which can lead to fatigue or even failure of the cable cleats. This reduces the cleats' ability to safely restrain the electrical cables in the event of a short circuit.

The electrical cables used in high-voltage applications are large and heavy, and therefore difficult to install quickly and safely. For example, each meter of a cable having a diameter of 80 mm may weigh in excess of 80 kg. Lifting and arranging each of three such cables into position within a sequence of cable cleats, such as trefoil cleats, where the three cables are arranged in a triangular configuration, is clearly a physically difficult and potentially dangerous task. Furthermore, where a plurality of cables is being laid, such as three cables being installed in a sequence of trefoil cleats, any error in orientation or position of a cable requires a significant amount of time and effort to be expended to correct the error.

Electrical cables used in high-voltage applications typically have a semi-conductive outer layer, or sheath, which coats an insulating layer of the cable. This sheath provides a flow path to earth for charge that builds up on the outer surface of the insulating layer, so that the outer surface of the cable does not become dangerously electrified. Furthermore, the sheath is used to carry out an over-voltage test, during which the sheath is grounded, and a potential is applied to an armouring layer of the cable, arranged beneath the insulating layer. If the insulating layer is damaged, such as during the installation procedure, a "flash-over" event may occur, which is measurable by appropriate measuring apparatus and which signals to the installer that the insulating layer is damaged.

SUMMARY

Preferred embodiments of the present disclosure seek to overcome one or more of the above disadvantages of the prior art.

According to an aspect of the present disclosure, there is provided a cable retaining apparatus including: a first portion partially defining at least one aperture for receiving a respective first cable; a second portion partially defining at least one first aperture, and partially defining at least one second aperture for receiving a respective second cable, wherein the second portion is configured to be mounted to the first portion to cause at least one first cable to be retained in a respective first aperture; and a third portion partially defining at least one second aperture and configured to be mounted to the first portion and the second portion when at least one first cable is retained in a respective first aperture, to cause at least one second cable to be retained in a respective second aperture.

This provides the advantage of enabling the or each first cable to be secured in position before manipulation of the or each second cable into the second aperture, thereby making installation of cables easier. The disclosure also provides the advantage of enabling the apparatus to have a continuous periphery, which in turn enables the apparatus to be made more robust and enabling lighter materials to be used.

The first portion may include at least one support configured to be mounted to the second portion, and at least one first body portion partially defining at least one first aperture, and the first body portion may be configured to be mounted to the second portion. This provides the advantage of increasing the stability of cables installed in the first apertures. This provides the advantage of enabling the first body portion to be flexible while maintaining its ability to provide stability to the cables installed in the first apertures, thereby further increasing the ease of installation of cables in the apparatus.

The second portion may include a first mounting part including at least one female threaded part configured to be mounted to the first body portion and to the third portion by means of at least one respective male threaded part passing through the female threaded part. This enables the male threaded part to be retracted out of the way of a cable being installed in a second recess, thereby providing the advantage of avoiding damage to the cable.

The female threaded part may be removably mounted to the second portion. This provides the advantage that the apparatus is easier to manufacture and repair.

The second portion may include a second mounting part for mounting the second portion to at least one support. This provides the advantage of increasing the stability of the second portion.

The second mounting part may include at least one protrusion or recess configured to engage a respective recess or protrusion on the support and retaining means for retaining the first and second portions in position relative to each other, such that engagement of at least one protrusion or recess with the corresponding recess or protrusion prevents electrical conduction from a first cable to the retaining means. This provides the advantage of decreasing the likelihood that, for a given operating potential, electric charge will be able to travel a tracking path between the cable and the retaining means, thereby increasing the safety of the apparatus.

The retaining means may engage at least one recess in the second portion. This provides the advantage of lengthening the tracking path of the electric charge from a second cable to the retaining means, thereby further increasing the safety of the apparatus.

The second portion may include a plurality of second body portions, each of which is configured to retain a respective first cable in the corresponding first aperture.

This provides the advantage of further increasing the ease with which cables can be installed in the first recesses, particularly in the situation where vertical installation is required.

At least one second body portion may include a profiled portion configured to engage a corresponding profiled portion on a further second body portion. This provides the advantage of providing further stability to the second portion, while simplifying manufacture of the second portion.

According to another aspect of the present disclosure, there is provided a support apparatus for supporting a cable retaining apparatus, the cable retaining apparatus including a body defining at least one aperture for receiving a respective cable, wherein the support apparatus includes: a carriage portion configured to be mounted to the cable retaining apparatus; and a track portion configured to be mounted to a support, such that the carriage portion is slidably mounted to the track portion in use while supporting a cable retaining apparatus having at least one cable supported in the cable retaining apparatus.

By providing such a support apparatus, a cable retaining apparatus is provided with the ability to move as one or more cables installed therein expand and contract due to thermal conditions, thereby reducing reaction forces exerted on the cable retaining apparatus and on the or each cable and consequently increasing reliability of installation of the or each cable.

The apparatus may further include stop means for limiting a range of sliding movement of the carriage portion relative to the track portion. This provides the advantage of helping to retain a cable being installed in the cable retaining apparatus in position while the cable is being installed in a further cable retaining apparatus. The apparatus may further include fastening means for fastening the track portion to a support.

The track portion may include a plurality of curved apertures for receiving fastening means for mounting the track portion to the support, wherein the apertures enable pivoting of the track portion relative to the fastening means. This provides the advantages of enabling an installer to locate the track portion more easily in a desired orientation during installation and enabling movement of an installed cable to cause the support apparatus to rotate, which further reduces reaction forces exerted on the cable retaining apparatus and on the or each cable.

The fastening means may include at least one respective bolt configured to engage the, or each, aperture.

The apparatus may further include restraining means for preventing rotation of the, or each, the bolt relative to the track portion. This provides the advantage of enabling a nut to be secured to a rear surface when a bolt head is inaccessible because it is occluded by the cable retaining apparatus.

The restraining means may include at least one connecting member for connection respective heads of a plurality of the bolts.

According to a further aspect of the present disclosure, there is provided an apparatus for preventing electrical conduction from a first member to a second member mounted to the first member, the apparatus including: a first insulator member configured to extend through a first aperture in the first member and a second aperture in the second member and to receive a bolt of a mounting assembly to prevent electrical conduction from the first member to the bolt; and a second insulator member having a first part for preventing electrical conduction directly from the first member to the second member and a second part configured to extend through the second aperture and to receive at least part of the first insulator member.

By providing such an apparatus, direct electrical connection between the first member and the second member is avoided, thereby increasing the safety of the apparatus. Also, by providing a second insulator member having a second part configured to extend through the second aperture and to receive at least part of the first insulator member, this lengthens any electrical discharge path between the first and second members, thereby making the electrical insulation more effective, while also enabling the apparatus to operate when the first member can move relative to the second member.

The first insulator member may have a third part configured to engage a head of the bolt extending through the first and second apertures and to prevent electrical conduction from the first member to the bolt. This provides the advantage of increasing a tracking distance from the bolt to the first member, thereby further increasing the safety of the apparatus.

The apparatus may further include a cover member for covering the head of the bolt. This provides the advantage of protecting the bolt from environmental damage.

The apparatus may further include a third insulator member configured to extend through an aperture in the second member and to prevent electrical conduction from the bolt and from a nut of the mounting assembly engaging the bolt to the second member. This provides the advantage of further increasing the safety of the apparatus.

At least part of the third insulator member may be configured to receive at least part of the first and/or second insulator member. This increases a tracking distance from the bolt to the first member, thereby further increasing the safety of the apparatus.

At least part of the third insulator member may be configured to be received in at least part of the first and/or second insulator member.

This increases a tracking distance from the bolt to the second member, thereby further increasing the safety of the apparatus.

According to a further aspect of the present disclosure, there is provided a cable retaining apparatus including: a body defining at least one aperture for receiving a respective cable; first insulator means arranged in the or each aperture for preventing electrical conduction from a cable to a surface of the body facing the cable; and second insulator means for preventing electrical conduction from a cable to a surface of the body facing away from the cable.

By providing such a cable retaining apparatus, both a tracking distance from a cable surface to a body of the apparatus is increased and direct contact between the cable surface and the body is prevented, thereby reducing the likelihood of the body becoming live and increasing the safety of the apparatus.

The second insulator means may include at least one insulation member extending from the body to lengthen an electrical conduction path from a cable to a surface of the body facing away from the cable. This further increases the tracking distance and correspondingly increases the safety of the apparatus.

At least one insulation member may be angled away from a cable in use. This provides an air gap between the surface of the cable and the insulation member which must be overcome for tracking to occur, thereby increasing the voltage required for tracking to occur and correspondingly increasing the safety of the apparatus.

The apparatus may further include at least one insert including a plurality of body members configured to be mounted to each other to define a second aperture for receiving a cable, wherein each body member includes engaging means configured to engage corresponding engaging means on a further body member to prevent electrical conduction from a cable received in the second aperture to a body of the cable retaining apparatus. By providing such an insert, a cable having a different outer diameter or shape to that of the inside of a cable retaining apparatus may be more securely and safely installed within the apparatus.

The engaging means may include at least one protrusion and/or first recess configured to engage a corresponding first recess and/or protrusion on a further body member. This provides the advantage of making the insert easier to install.

The insert may further include at least one flange portion extending from a respective end portion of the body member. This provides the advantage of increasing a tracking distance from a surface of the cable to the apparatus, thereby increasing the safety of the apparatus.

At least one body member may define a respective second recess for receiving an elongate member arranged adjacent the cable. This provides the advantage that further cables may be installed in the insert, such as thermal monitoring cables, which increases the versatility of the insert.

BRIEF DESCRIPTION OF THE DRAWINGS

Preferred embodiments of the present disclosure will now be described, by way of example only and not in any limitative sense, with reference to the accompanying drawings, in which.

DETAILED DESCRIPTION

Figure 1:
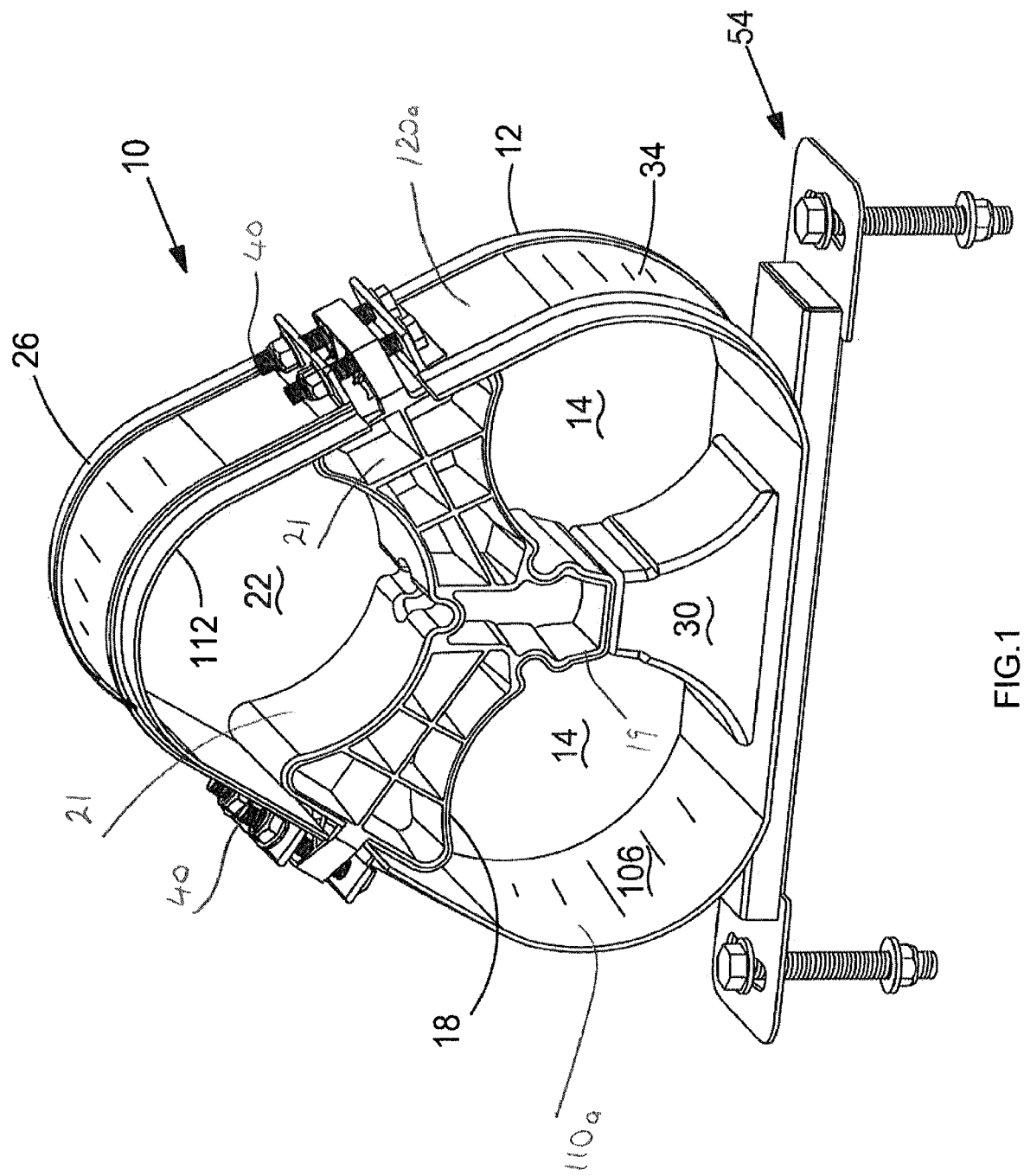
FIG. 1 is a perspective view of an apparatus of an embodiment of the present disclosure.
Figure 2:
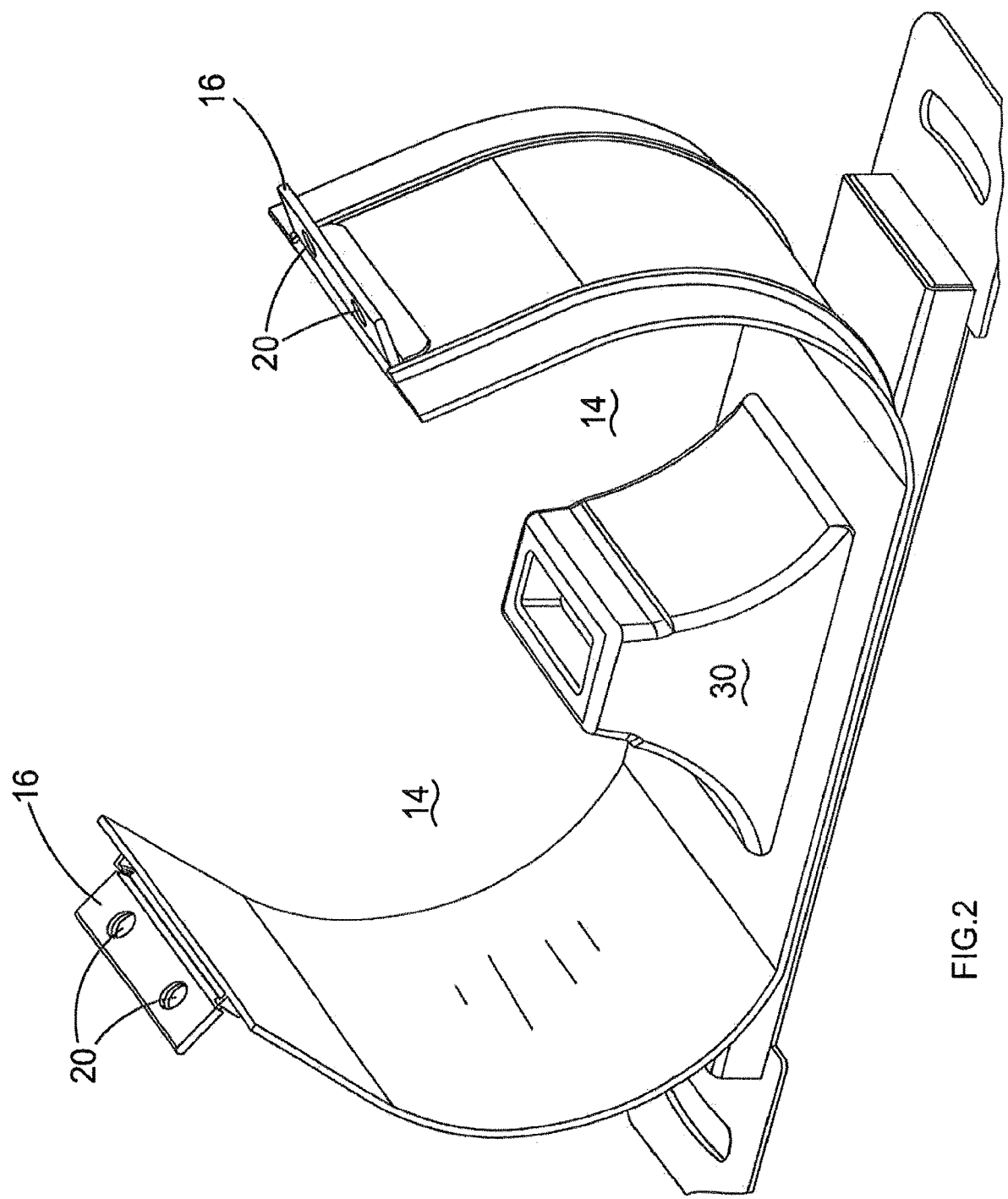
FIG. 2 is a perspective view of a first portion of the apparatus of FIG. 1.

Referring to FIGS. 1 to 8, an apparatus for retaining electrical cables is shown in the form of a trefoil cleat 10.

Referring to FIGS. 1 to 5, the cleat 10 includes a first portion 12 including a first body portion 34, which partially defines first apertures 14, and a support 30. Each first aperture 14 is sized and shaped to receive a cable (not shown). Two pairs of first fixing apertures 20 through first fixing portions 16 are shown on the first body portion 34 in FIG. 2 for receiving co-operatively threaded bolts 40 for fixing further body portions to the first portion 12.

Figure 3:
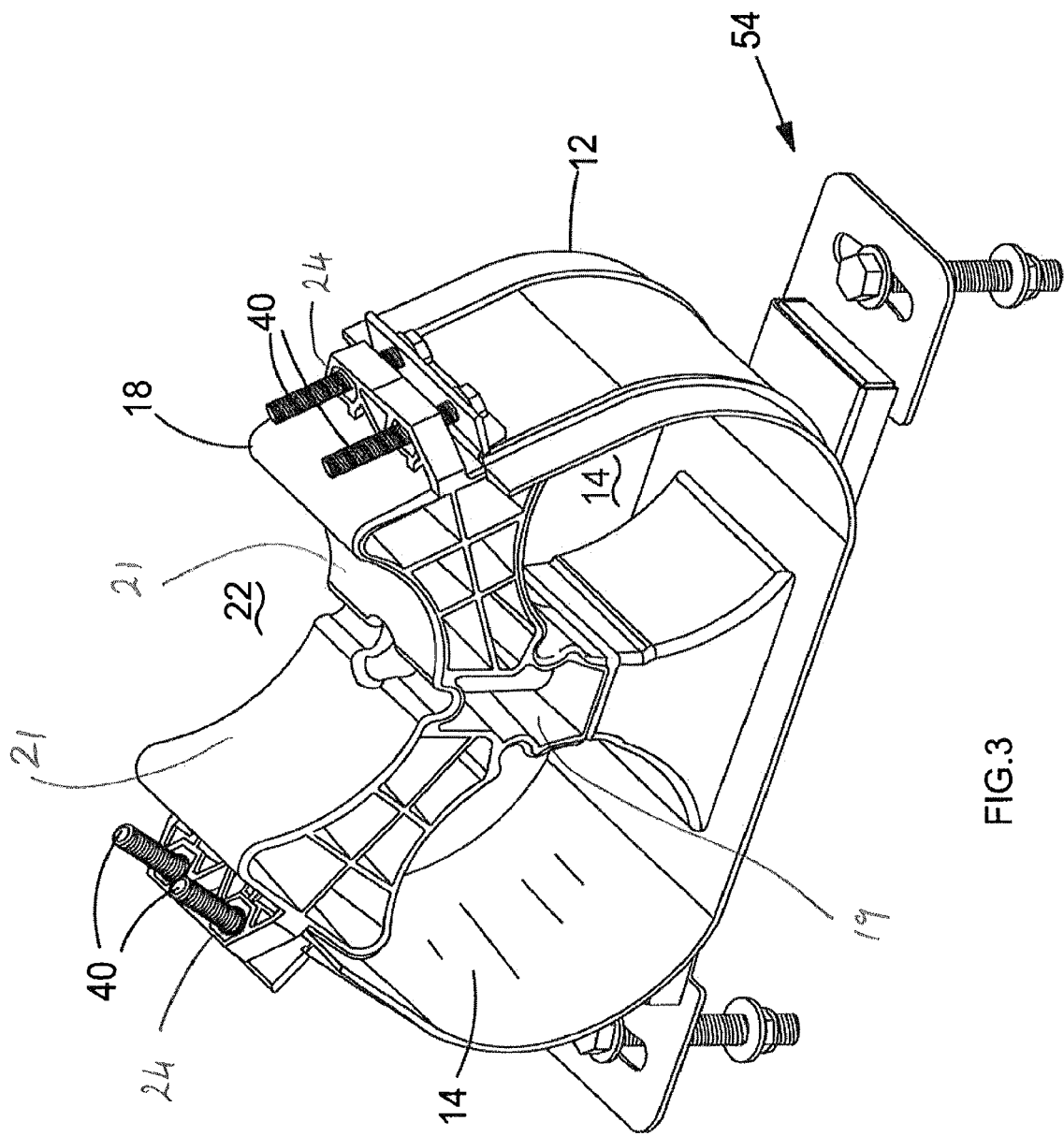
FIG. 3 is a perspective view of second portion of the apparatus of FIG. 1 mounted on the first portion of FIG. 2.

The cleat 10 further includes a second portion 18 including a central portion 19 and a pair of wing-shaped portions 21. The second portion 18 is sized and shaped such that, when the second portion 18 is mounted on the first portion 12, as shown in FIG. 3 in particular, the second portion 18 closes first apertures 14 and defines a barrier between first apertures 14 such that cables passing through first apertures 14 are kept apart from one another. Two pairs of second fixing apertures 24 through first mounting part 36 are shown for receiving bolts 40. The second fixing apertures receive removable female threaded parts 38 which engage bolts 40 and which can be easily replaced if their threads become damaged, thereby avoiding the necessity of replacing the whole second portion 18.

Figure 6:
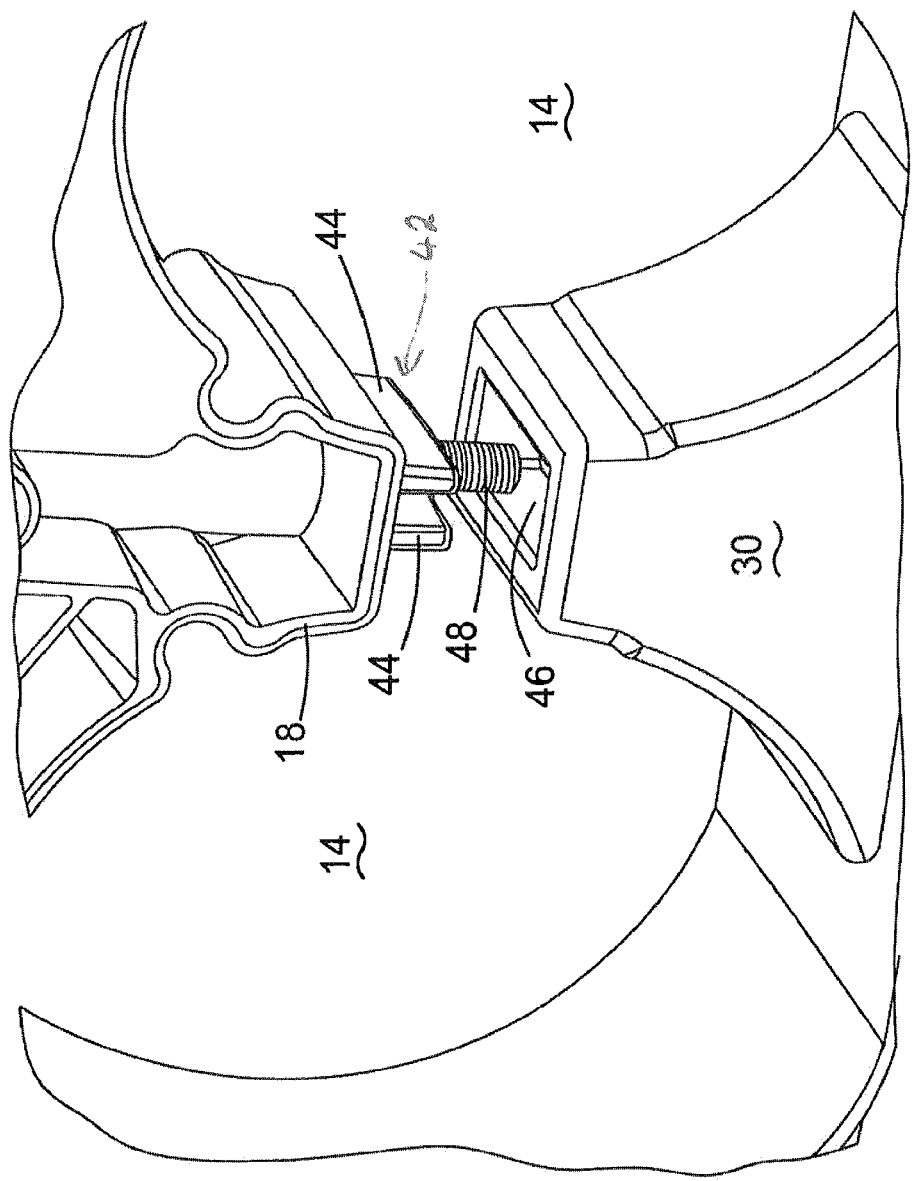
FIG. 6 is a close-up perspective view of a second portion being mounted to a support of a first portion of an apparatus of a further embodiment.
Figure 7:
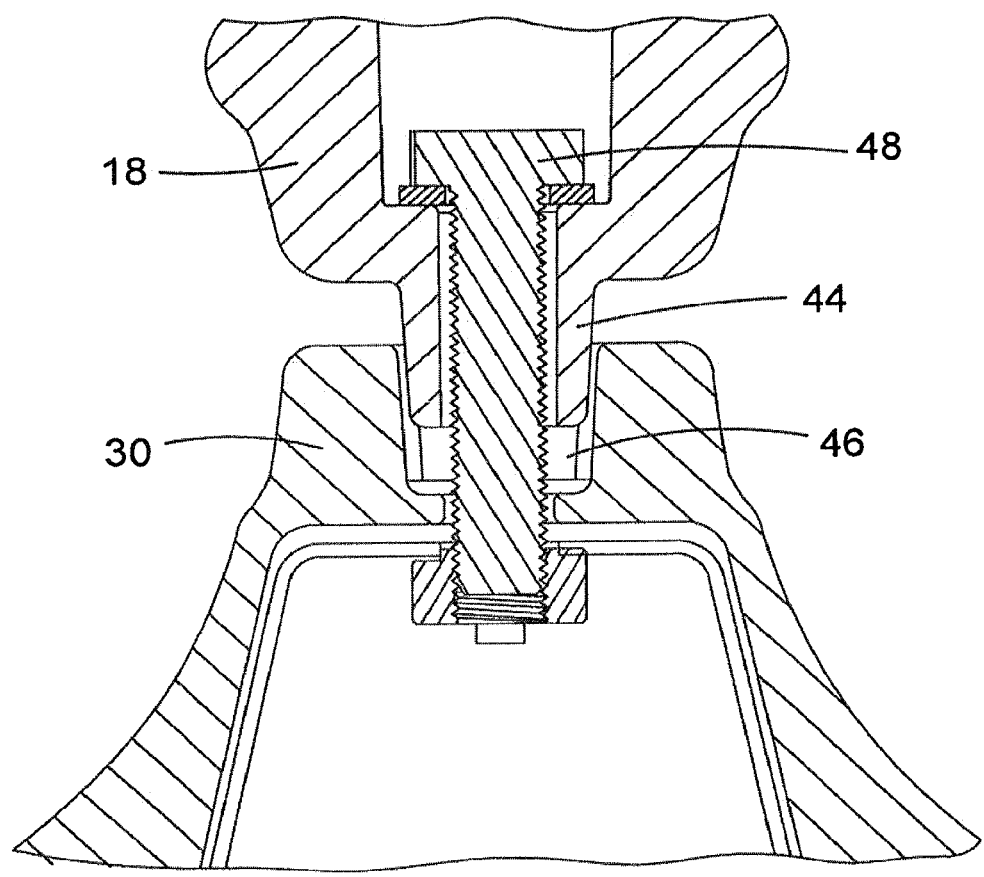
FIG. 7 is a cross-sectional view of the embodiment of FIG. 6.

Referring to FIGS. 6 and 7 in particular, retaining means in the form of bolt 48 is shown for fixing the second portion 18 to the first portion 12 via support 30. The second portion 18 is shown having a second mounting part 42 in the form of protrusions 44 which slide into a corresponding recess 46 of the support 30 to provide stability. When the second portion 18 is bolted to the first portion 12, the two cables within first apertures 14 are securely retained prior to installation of a third cable (not shown).

Figure 4:
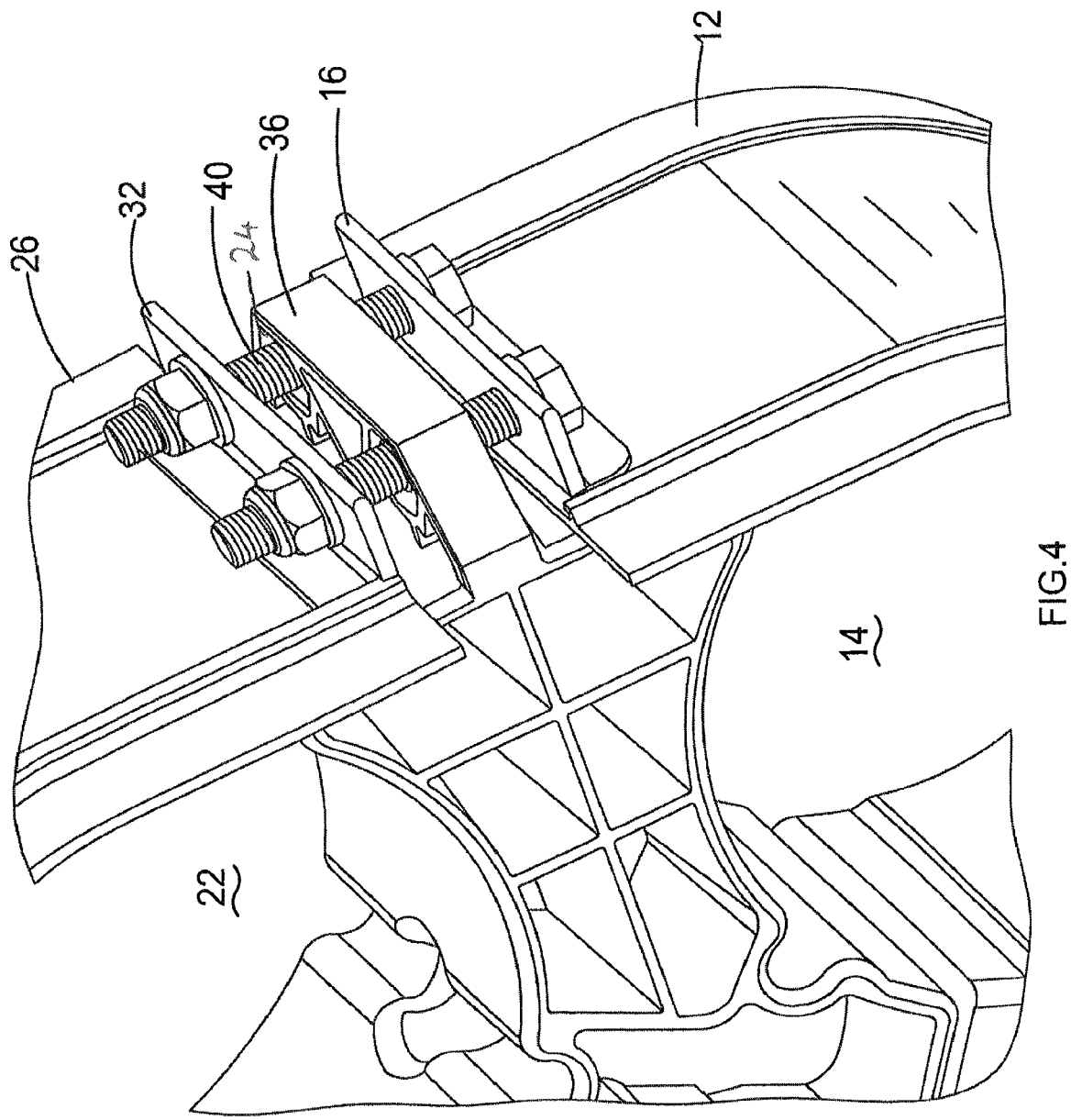
FIG. 4 is a close-up perspective view of mounting means of FIG. 1.
Figure 5:
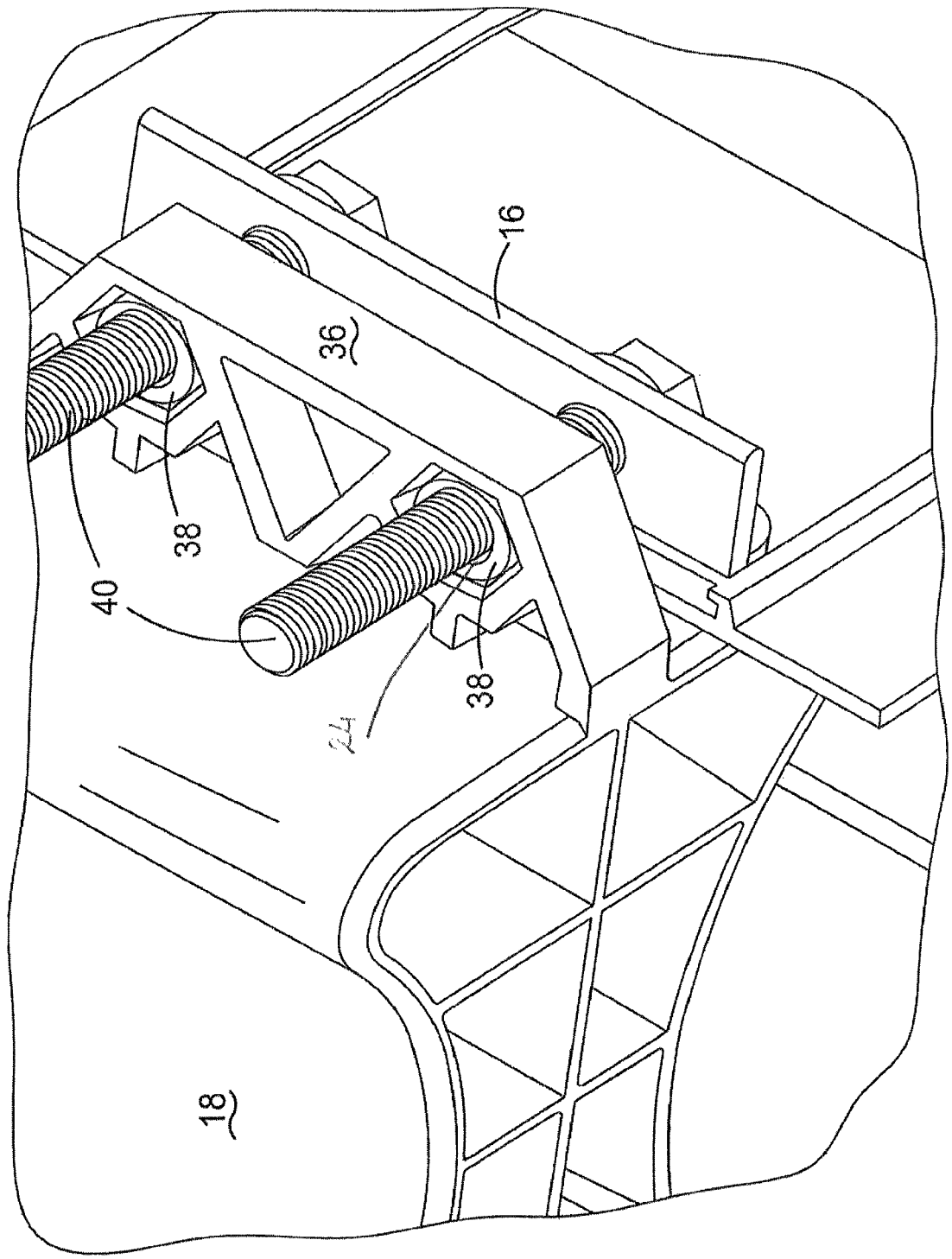
FIG. 5 is a close-up perspective view of mounting means shown in FIG. 3.

The wing-shaped portions 21 of the second portion 18 partially define a second aperture 22 for receiving the third cable. Referring to FIGS. 1 and 4, a third portion 26 is shown mounted to the first portion 12 and second portion 18 by bolts 40 passing through third fixing apertures 28 (FIG. 8) of third fixing portions 32 (see FIGS. 8 and 13). The third portion 26 is sized and shaped such that, when the third portion 26 is mounted on the second portion 28, the third portion 26 closes second aperture 22 to hold a cable received in second aperture 22 in place. The wing-shaped portions 21 of the second portion 18 can therefore be seen to define barriers between second aperture 22 and first apertures 14 such that a cable passing through second aperture 22 is kept apart from the cables passing through first apertures 14. The first, second, and third portions 12, 18, 26 are sized and shaped such that cables received in apertures 14, 18 define a trefoil arrangement.

The third portion 26 can be mounted to the first 12 and second 18 portions after cables have been secured in position in the first apertures 14 by means of the first 12 and second 18 portions, thereby making installation of a cable in the second aperture 22 easier. In addition, the first body portions 34 and third portion 26 define a continuous periphery of the cleat 10, which enables a stronger construction of the cleat 10 and enables lighter materials to be used.

It is to be understood that the first, second, and third portions 12, 18, 26 may have different sizes and shapes to define different aperture diameters, to receive a different number of cables, to receive differently shaped cables, or to separate cables into arrangements other than trefoil.

Figure 8:
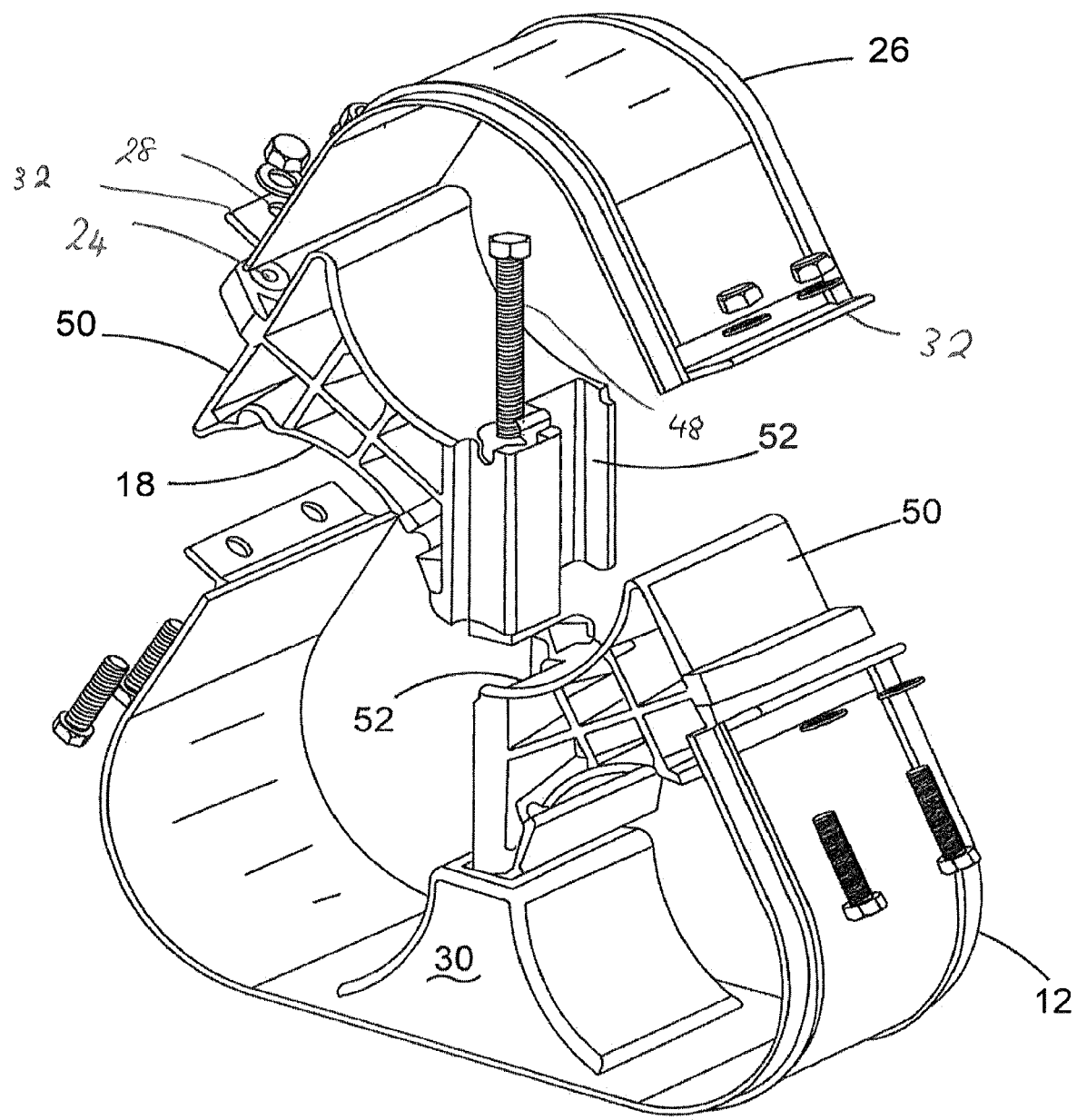
FIG. 8 is a partially exploded perspective view of second body portions of an apparatus of a further embodiment of the present disclosure.

Referring to FIG. 8, second portion 18 is shown in the form of two second body portions 50. Each second body portion 50 includes a pair of profiled portions 52 for engaging a corresponding profiled portion 52 of the other second body portion 50. Each second body portion 50 is also shown to be individually mountable to the first portion 12 and to the support 30.

Figure 9:
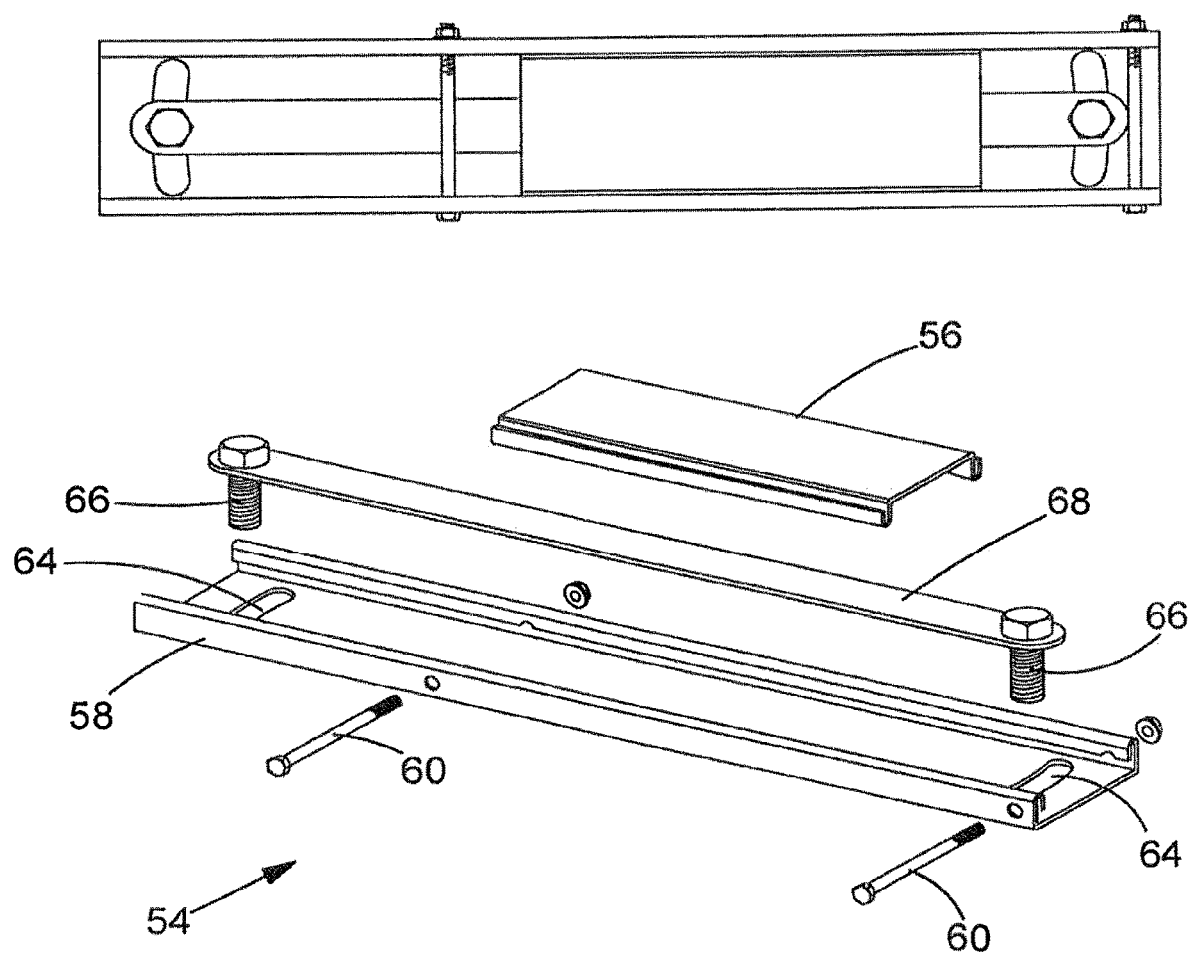
FIG. 9 is a perspective view of a support apparatus of a further embodiment of the present disclosure.
Figure 10:
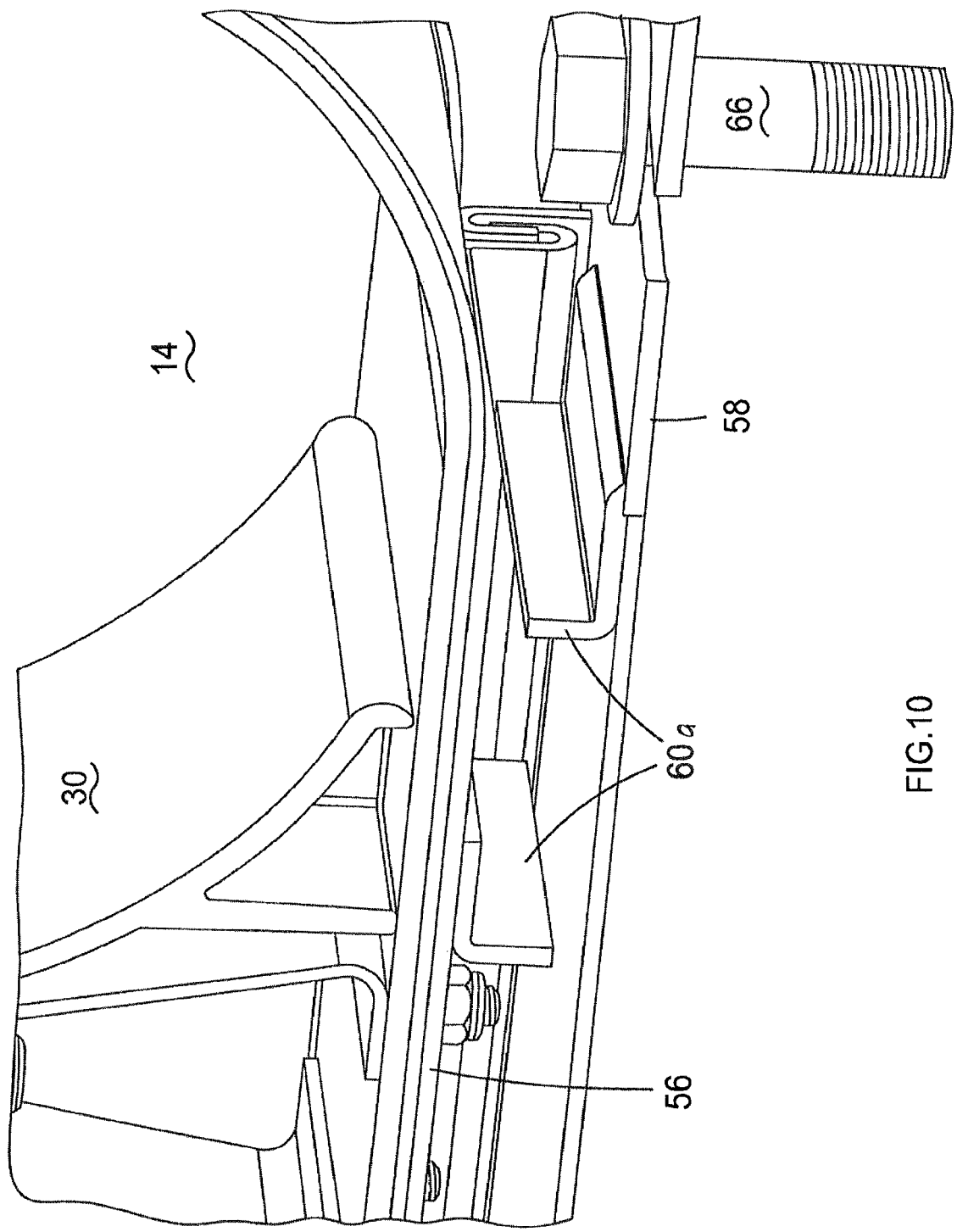
FIG. 10 is a close-up perspective view of a support apparatus of a further embodiment of the present disclosure.
Figure 11:
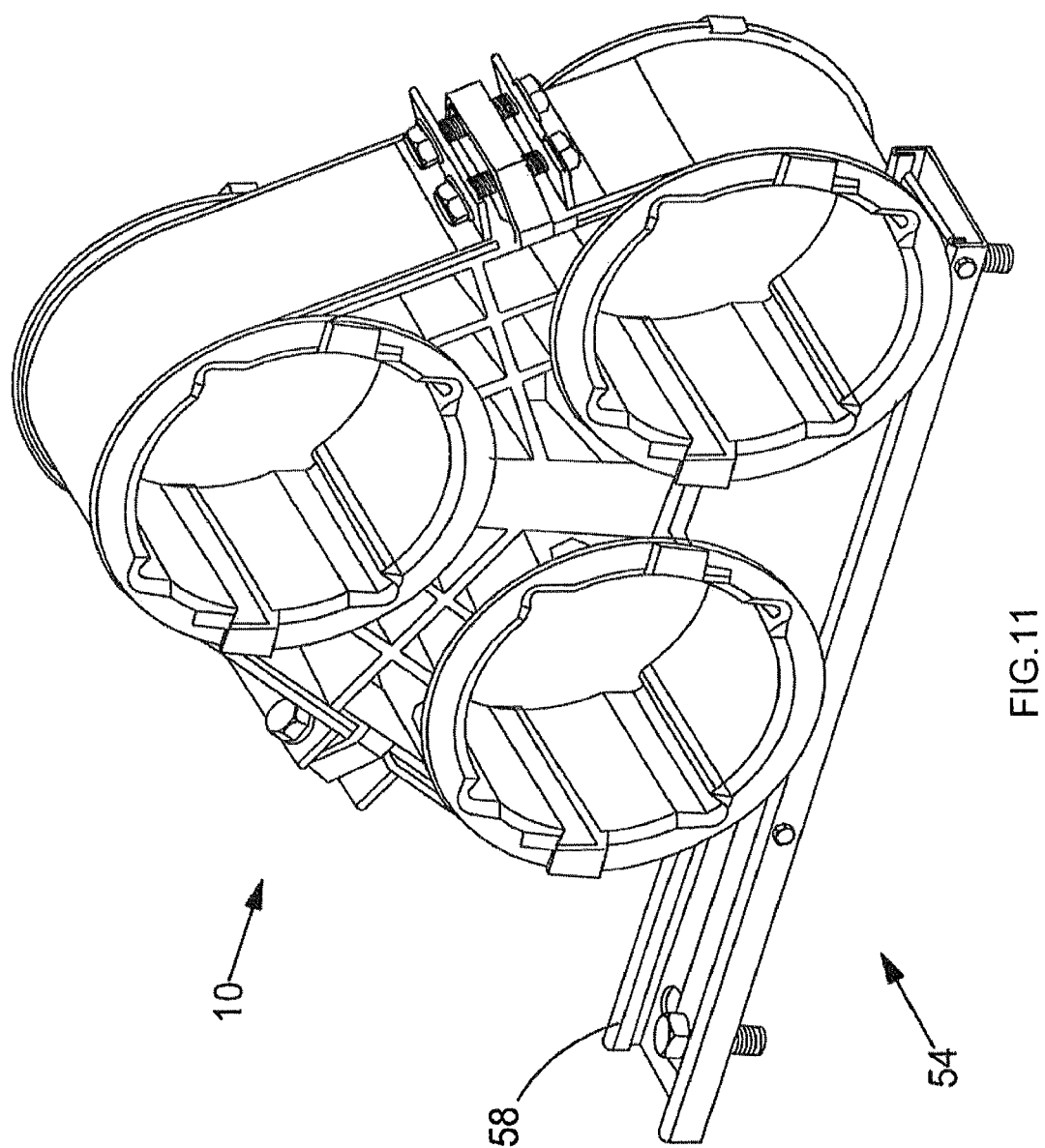
FIG. 11 is a perspective view of an apparatus of an embodiment of FIGS. 1 to 8 mounted on a support apparatus of FIGS. 9 to 10.

Referring to FIGS. 9 to 11, a support apparatus 54 for mounting cleat 10 to a support is shown.

The support apparatus 54 includes a track portion 58 and a carriage portion 56 arranged to co-operate with the track portion 58 so that the carriage portion 56 may slide along the track portion 58.

The first portion 12 of the cleat 10 is configured to be fixed to the carriage portion 56, thereby fixing the cleat 10 to the support apparatus 54.

Figure 12:
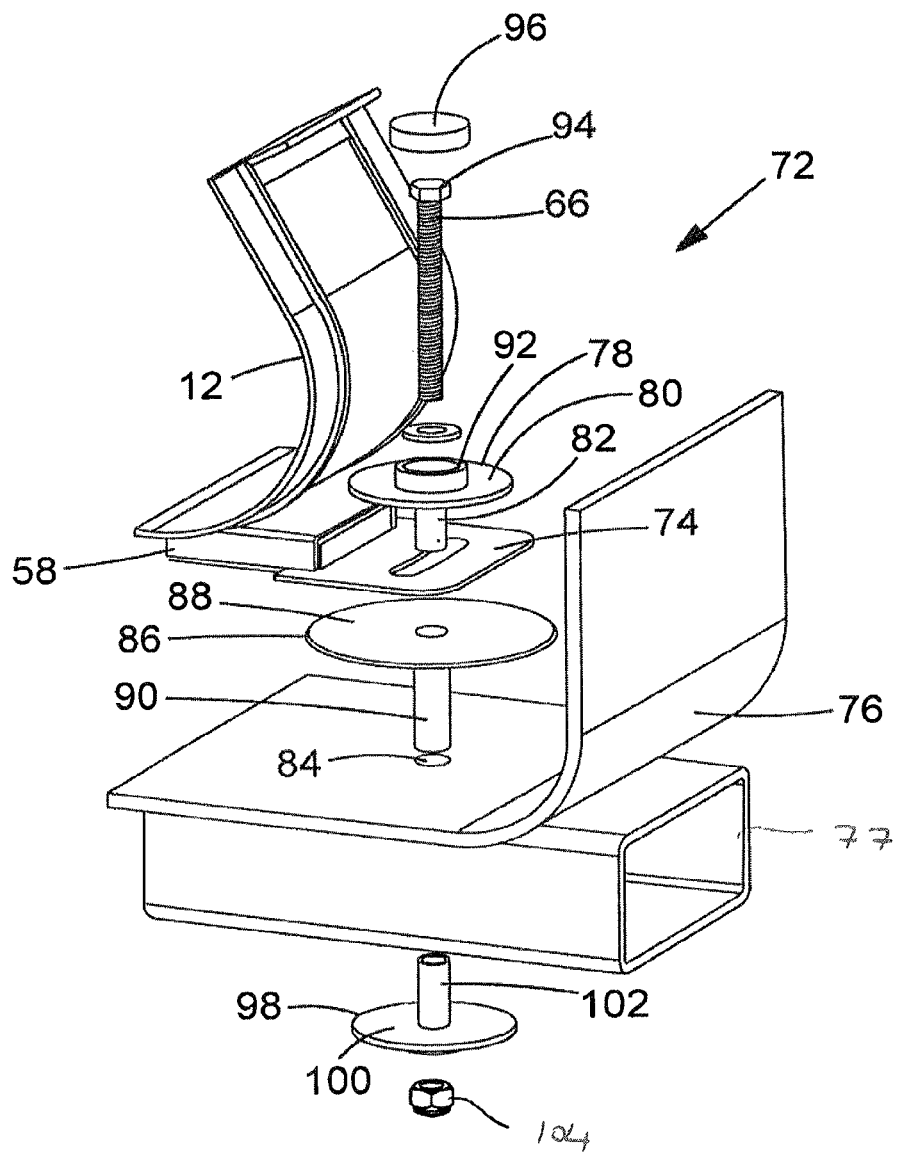
FIG. 12 is an exploded perspective view of a bolt shroud of a further embodiment of the present disclosure.

The track portion 58 includes a pair of curved apertures 64. The apertures receive bolts 66 which enable the track portion 58 to be mounted to a support 77 (FIG. 12). The bolts 66 are held captive against rotation on restraining means in the form of a bar 68 which has a length chosen to match the distance separating apertures 64 but are otherwise free to move within the apertures 64. The radius of curvature of the apertures 64 and the distance between the apertures 64 are chosen such that the apertures 64 are diametrically opposed about a common centre. The apertures thereby allow rotation of the track portion 58 within the length of the apertures 64.

The track portion 58 is shown including stop means in the form of two abutment bolts 60. The abutment bolts 60 abut the carriage portion 56 to prevent the carriage portion 56 from sliding outside of a desired sliding range defined by the distance between the abutment bolts 60. The desired sliding range depends on the expected thermal expansion of the cables. As the cable expands and contracts, and therefore buckles, between a highest temperature and a lowest temperature, the cables retained by the cleat 10 located on the support apparatus 54 will cause the carriage portion 56 to slide along the track portion 58. The position of one abutment bolt 60 through the track portion 58 corresponds to a limit position of the carriage portion 56 on the track portion 8 where the cable is at the lowest temperature, and the position of the other abutment bolt 60 through the track portion 58 corresponds to a further limit position of the carriage portion 56 on the track portion 58 where the cable is at the highest temperature. In this way, the support apparatus 54 compensates for the deformation of the cables retained by the cleat 10 to minimise the stresses experience by the cleat 10 and support apparatus 54.

Referring to FIG. 10, the track portion 58 is shown including a second abutment is shown in the form of a pair of abutment walls 60a. One of the pair of abutment walls 60a is fixed to an underside of the carriage portion 56, while the other of the pair is fixed to the track portion 58. The abutment wall pair 60a limits the relative motion of the track portion 58 and carriage portion 56 in a similar manner to the abutment bolts 60.

Referring to FIG. 12, an apparatus for preventing electrical conduction from a first member to a second member is shown in the form of a bolt shroud assembly 72, which includes a first insulator member 78, a second insulator member 86, a cover member 96, and a third insulator member 98. The first member shown is an end part 74 of track portion 58, through which curved aperture 64 is defined, and the second member shown is a support 77, through which a pair of apertures (not shown) coaxial with aperture 84 through cable duct 76 is defined.

The insulator members 78, 86, 98 are shown having T-shaped cross-sections and apertures therethrough for receiving bolt 66. Each insulator member 78, 86, 98 has a respective flattened portion 80, 88, 100 and a respective extended portion 82, 90, 102.

The first flattened portion 80 prevents a head of the bolt 66 from making direct contact with the end part 74. The second flattened portion 88 prevents the end part 74 from making direct electrical contact with the cable duct 76. The third flattened portion 100 prevents a nut 104, threaded onto bolt 66, from making direct electrical contact with the support 77.

The first extended portion 82 and the third extended portion 102 are sized and shaped to fit between bolt 66 and an inner wall of the second extended portion 90 when assembled. In this way, the extended portions 82, 90, 102 prevent the bolt 66 from making direct electrical contact with the end part 74 and the support 77. Furthermore, the extended portions 82, 90, 102 present a labyrinthine conduction path from the end part 74 to the support 77 to decrease the likelihood that a potential may be carried from an electrically live end part 74 over surfaces of the insulator members 78, 86, 98 to the support 77.

The first insulator member 78 also has a raised portion 92 which is configured to both lengthen a conduction path from the head of the bolt 66 to the end part 74 and to receive the co-operatively shaped cover member 96.

Figure 13:
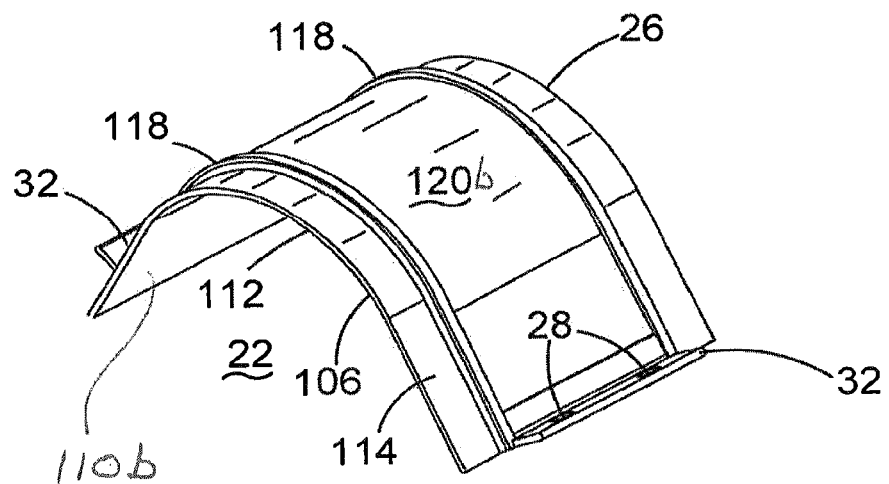
FIG. 13 is a perspective view of a liner of a further embodiment of the present disclosure mounted to a third portion of an embodiment of FIGS. 1 to 8.
Figure 14:
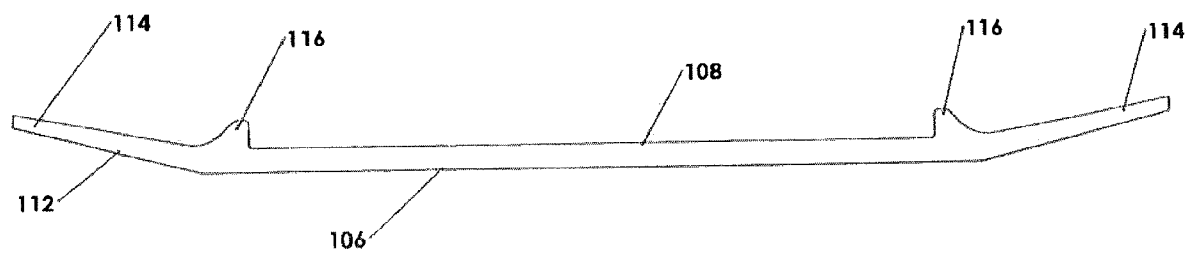
FIG. 14 is a side view of a liner of a further embodiment of the present disclosure.

Referring to FIGS. 1, 13, and 14, insulator means including first insulator means 106 in the form of insulating liners 108 and second insulator means 112 in the form of insulation members 114 is shown arranged adjacent inner surfaces 110a, 110b of the first portion 12 and third portion 26 respectively. The insulating liners 108 and insulation members 114 provide an insulating barrier between a cable received in an aperture 14, 22 and the respective portion 12, 18. The insulation members 114 extend beyond the edges of the portions 12, 18 in the direction of the longitudinal axis of the respective apertures 14, 22. Referring to FIG. 14, the insulation members 114 are shown angled such that they extend away from the installed cables, and are shown having a pair of engaging portions 116 for engaging corresponding tracks 118 on outer surfaces 120a, 120b of the first portion 12 and third portion 26 respectively.

Figure 15:
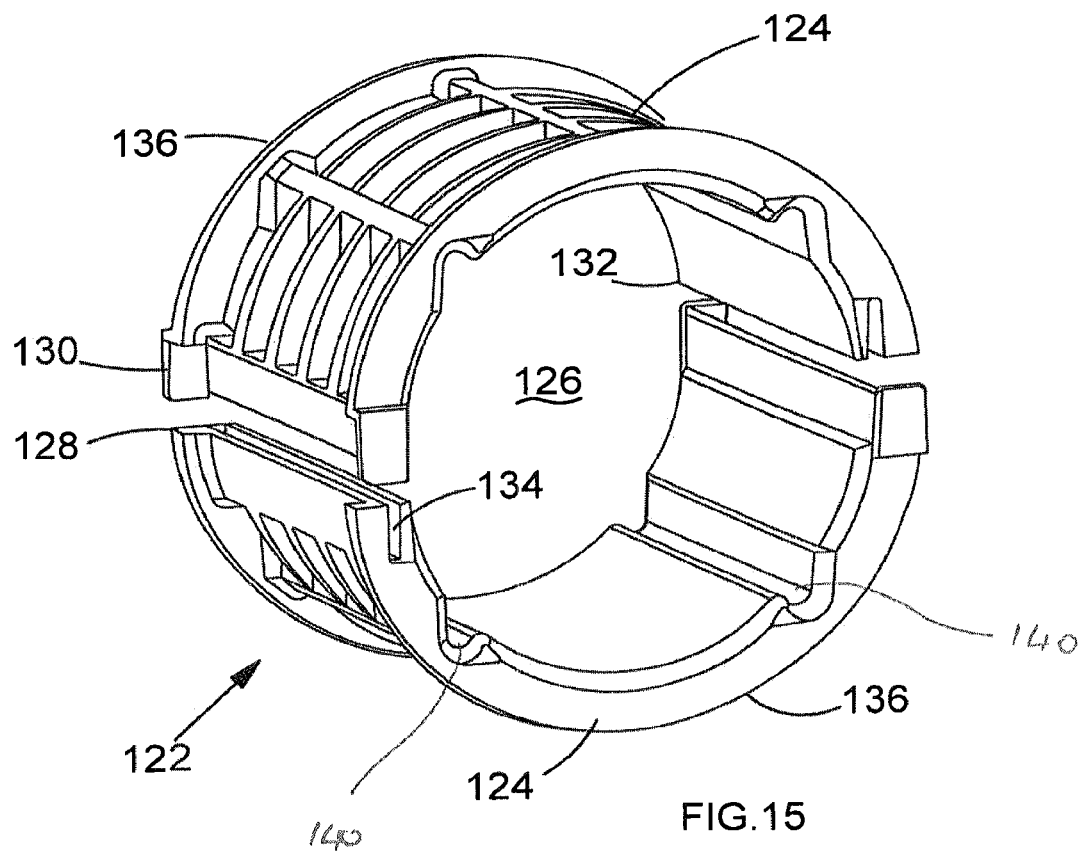
FIG. 15 is a perspective view of an insert of a further embodiment of the present disclosure.
Figure 16:
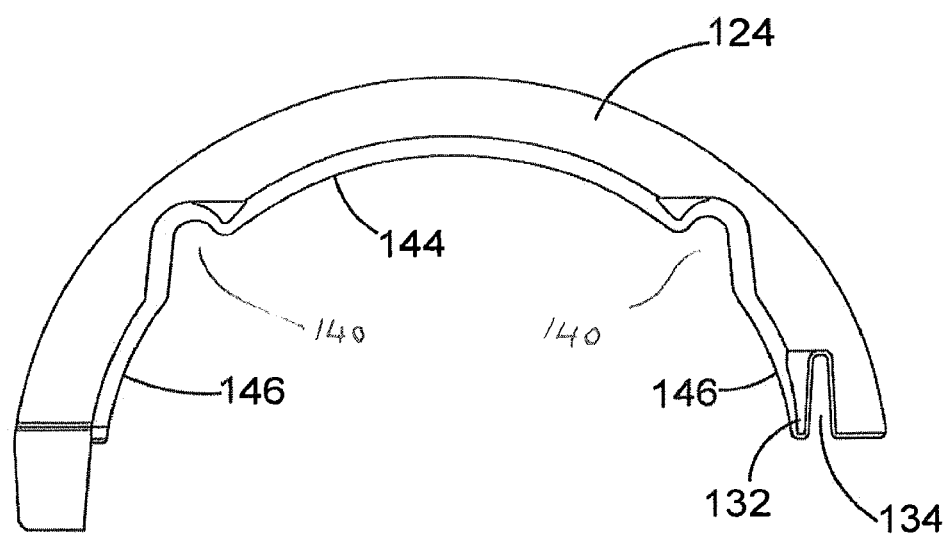
FIG. 16 side view of a body member of an insert of a further embodiment of the present disclosure.

Referring to FIGS. 15 and 16, an insert 122 for use with a cleat such as cleat 10 is shown.

Insert 122 is shown having an annular cross-section and including two identical body members 124 configured to slot together by means of first engaging means 128 in the form of first recesses 134 and protrusions 132 and corresponding second engaging means 130 in the form of protrusions 132 and first recesses 134 in a modular fashion to form the insert 122. The insert 122, when assembled, defines an aperture 126.

The body members 124 are shown including semi-annular flange portions 136. Both the recess 134-protrusion 132 pairs and the flange portions 136 lengthen a path to the external surface of the cable cleat 10 for surface charges on the surface of a current-carrying cable retained within the insert 122, thereby increasing the voltage required to cause the cleat 10 to become electrically live, and therefore hazardous.

Referring to FIG. 16 in particular, a body member 124 is shown including a first inner face 144 and a second inner face 146. The inner faces 144 and 146 are shown having different radii of curvature. Matching the radius of curvature of an inner face 144, 146 of the insert 122 to the radius of curvature of the surface of a cable to be retained within the insert 122 provides safe and effective gripping of the cable, so an insert 122 having inner faces 144, 146 with different radii of curvature is able to provide such a grip to two differently sized cables, avoiding the need to manufacture two different inserts 122. Second recesses 140, for receiving an elongate member such as an electrical or fibre optic data cable (not shown) are arranged between the inner faces 144, 146.

An exemplary method for retaining cables in a cleat 10 and mounting the cables to a support 77 in accordance with the present disclosure will now be described.

1. First portion 12 of cleat 10 is secured to the carriage portion 56 of the support apparatus 54.

2. Support apparatus 54 is secured to a support 77, which supports a cable duct 76 along which cables are to be run, by fixing bolts 66 through apertures 64 of the track portion 58 to the support 77 via the components of the bolt shroud assembly 72 as described above.

3. Body members 124 having respective inner diameters appropriately matched to grip respective outer diameters of cables to be retained are located in each of the first apertures 14 of the first portion 12.

4. Cables are located within the body members 124.

5. Further body members 124 are clipped around the located cables into present body members 124 to form completed inserts 122 which enclose the located cables.

6. Second portion 18 of cleat 10 is secured to first portion 12 using bolt 48, thereby securing inserts 122 within the first apertures 14, securing the located cables within the inserts 122, and retaining the cables separated from one another by the barrier formed from the support 30 and the second portion 18.

7. Another body member 124 is located within second aperture 22 of second portion 18.

8. A further cable is located within this body member 124.

9. A further body member 124 is clipped around the further located cable to complete insert 122 and enclose the further located cable.

10. The third portion 26 is located over the insert 122 enclosing the further located cable and secured to the first portion 12 and second portion 18 using bolts 40 threaded through fixing apertures 20, 24, and 28, thereby securing the insert 122 within second aperture 22, securing the further located cable within the insert 122, and retaining the further located cable separated from the cables located in first apertures 14 by the wing-shaped portions 21 of the second portion 18.

One or more cables to be retained within a cleat 10 can be retained without the use of respective one or more inserts 122, using the method above but without locating respective body members 124. The track portion 58 of support apparatus 54 can be secured to a support 77 in a horizontal orientation, such as on a floor or a ceiling, or a vertical orientation, such as a wall, or any orientation therebetween. Insulating liners 106, 112 may be included on the inner faces of the first portion 12 and third portion 26 prior to carrying out the above method.

Further flash-over protection may be provided by coating any or all conductive parts of the cleat with an insulating material, such as a polymer, in the form of a spray.

In use, the cables carry currents which cause the cables to heat up. This causes the cables to expand, which causes the cables to buckle along their lengths. As a cable buckles, parts of the cable move laterally. A cable retained within a cleat, such as cleat 10 of the present disclosure, which is mounted to the support apparatus 54 of the present disclosure is able to move laterally as the buckling of the cable causes the carriage portion 56 to slide along the track portion. This reduces shear forces exerted on the cleat, thereby reducing wear and tear experienced by both the cable and the cleat and increasing safety by reducing the likelihood of such wear and tear leading to an electrical short circuit.

As cables heat up as described above, their resistance increases, thereby reducing electrical efficiency. Cables which are bunched up together in a cleat, rather than separated from one another as by cleat 10 of the present disclosure, expose less of their surface area to the surrounding air, which exacerbates this heating effect. In contrast, cables mounted in cleat 10 are separated from one another, which enables more efficient cooling of the cables as they carry current. This improves electrical efficiency, reduces the amount of buckling which takes place, and consequently increases safety.

It will be appreciated by persons skilled in the art that the above embodiments have been described by way of example only and not in any limitative sense, and that various alterations and modifications are possible without departure from the scope of the disclosure as defined by the appended claims.

LIST OF NUMBERED FEATURES 10 cleat
12 first portion
14 first aperture
16 first fixing portions
18 second portion
19 central portion
20 first fixing apertures
21 wing shaped portions
22 second aperture
24 second fixing apertures
26 third portion
28 third fixing apertures
30 support 32 third fixing portions
34 first body portion
36 first mounting part
38 female threaded part
40 bolt
42 second mounting part
44 protrusion
46 recess
48 bolt
50 second body portion
52 profiled portion
54 support apparatus
56 carriage portion
58 track portion
60 abutment bolts
60a abutment walls
64 curved aperture
66 bolt
68 bar
72 conduction preventing apparatus
74 end part
76 cable duct
77 support
78 first insulator member
80 first flattened portion
82 first extended portion
84 aperture
86 second insulator member
88 second flattened portion
90 second extended portion
92 raised portion
94 bolt head
96 cover member
98 third insulator member
100 third flattened portion
102 third extended portion
104 nut
106 first insulator means
108 insulating liners
110a, b inner surfaces
112 second insulator means
114 insulation member
116 engaging portions
118 tracks
120a, b outer surfaces
122 insert
124 body member
126 aperture
128 first engaging means
130 second engaging means
132 protrusion
134 first recess
136 flange portion
140 second recess
144 first inner face
146 second inner face

The invention claimed is:

1. A support apparatus configured for supporting a cable retaining apparatus, the cable retaining apparatus including a body defining at least one aperture for receiving a respective cable, wherein the support apparatus comprises:
   a carriage portion configured to be mounted to the cable retaining apparatus; and
   a track portion configured to be mounted to a support, wherein the track portion includes a plurality of curved apertures for receiving a fastening device for mounting the track portion to the support, such that the carriage portion is slidably mounted to the track portion and the apertures enable pivoting of the track portion relative to the fastening device when the support apparatus is in use while supporting a cable retaining apparatus having at least one cable supported in the cable retaining apparatus.

2. An apparatus according to claim 1, further comprising a stop device for limiting a range of sliding movement of the carriage portion relative to the track portion.

3. An apparatus according to claim 1, further comprising a fastening device for fastening the track portion to the support.

4. A support apparatus according to claim 3, wherein the fastening device includes at least one respective bolt configured to engage the, or each, aperture.

5. A support apparatus according to claim 4, further comprising a restraining device for preventing rotation of the, or each, bolt relative to the track portion.

6. A support apparatus according to claim 5, wherein the restraining device includes at least one connecting member for connecting respective heads of a plurality of the bolts.

* * * * *